United States Patent [19]

Strauss et al.

[11] 4,138,437
[45] Feb. 6, 1979

[54] PROCESS FOR THE PREPARATION OF TERTIARY ALIPHATIC AMINES

[75] Inventors: Julius Strauss, Altötting; Herbert Hübner, Burgkirchen, Alz; Heinz Müller, Burgkirchen, Alz; Engelbert Krempl, Burgkirchen, Alz, all of Fed. Rep. of Germany

[73] Assignee: Hoechst Aktiengesellschaft, Frankfurt am Main, Fed. Rep. of Germany

[21] Appl. No.: 790,897

[22] Filed: Apr. 26, 1977

Related U.S. Application Data

[63] Continuation-in-part of Ser. No. 711,720, Aug. 5, 1976, abandoned.

[30] Foreign Application Priority Data

Aug. 6, 1975 [DE] Fed. Rep. of Germany ....... 2535073

[51] Int. Cl.$^2$ ..................... C07C 85/06; C07C 85/08
[52] U.S. Cl. ............................. 260/583 R; 260/583 H
[58] Field of Search ........... 260/583 R, 585 B, 585 C, 260/583 H

[56] References Cited

U.S. PATENT DOCUMENTS

| | | | |
|---|---|---|---|
| 2,413,598 | 12/1946 | Ballard et al. | 260/501 X |
| 2,953,601 | 9/1960 | Whitaker | 260/585 B |
| 3,223,734 | 12/1965 | Fallstad et al. | 260/583 R |
| 3,366,687 | 1/1968 | Ellis et al. | 260/583 R |
| 3,520,933 | 7/1970 | Adam et al. | 260/585 B |

OTHER PUBLICATIONS

Astle, "Industrial Organic Nitrogen Compounds", pp. 10 & 11 (1961).
Ginsburg, "Concerning Amines", 1st Ed., pp. 33–38 (1967).

*Primary Examiner*—Winston A Douglas
*Assistant Examiner*—John Doll
*Attorney, Agent, or Firm*—Connolly and Hutz

[57] ABSTRACT

A process for the preparation of tertiary aliphatic amines containing an alkyl or alkenyl radical having 8 to 24 carbon atoms and at least one methyl group by reacting a liquid alcohol or aldehyde having 8 to 24 carbon atoms in the presence of a copper-chromium oxide catalyst with a gaseous mixture containing hydrogen and a lower primary or secondary alkyl amine having at least one methyl group, the amine proportion of the gas mixture being in the range of from 1 to 20% by volume, eliminating the water having been formed in the reaction from the gaseous mixture, and recirculating the gaseous mixture continuously back into the liquid alcohol or aldehyde.

5 Claims, 1 Drawing Figure

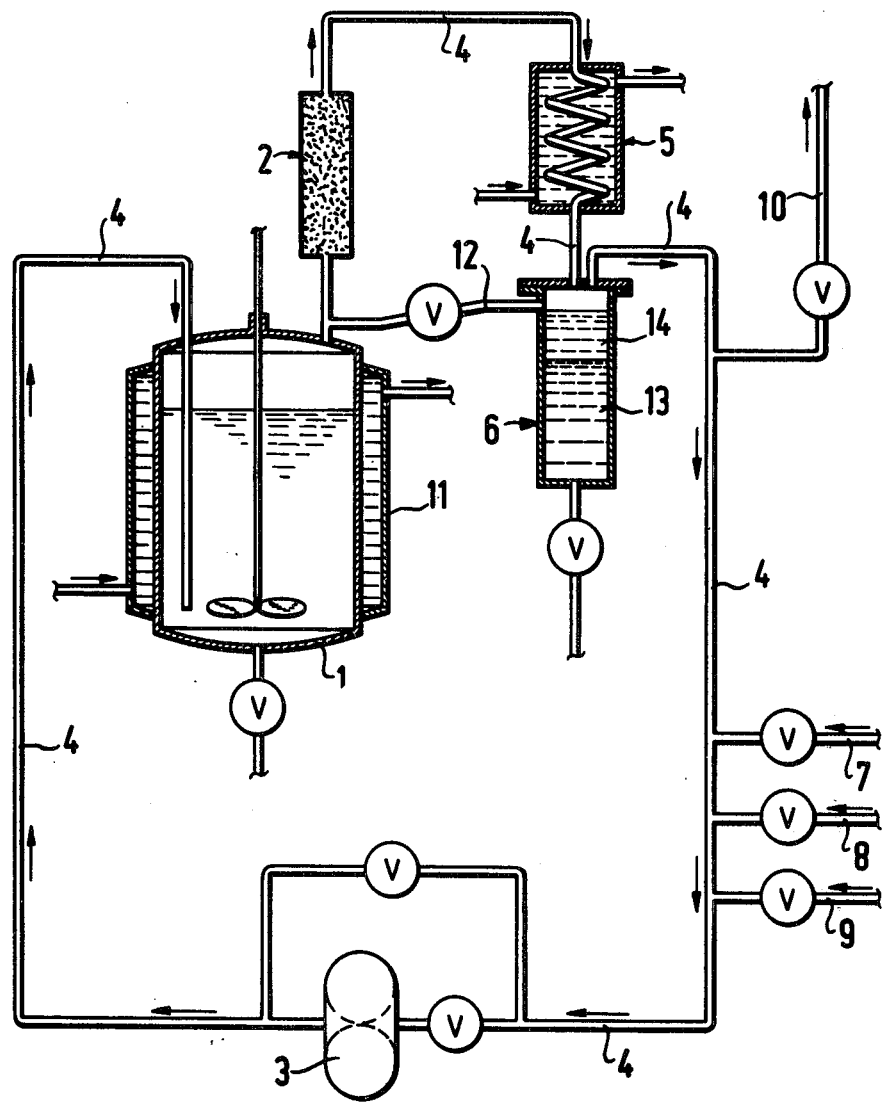

PROCESS FOR THE PREPARATION OF TERTIARY ALIPHATIC AMINES

This is a continuation-in-part application of application Ser. No. 711,720 filed Aug. 5, 1976 now abandoned.

The present invention relates to a process for the preparation of tertiary aliphatic amines.

The present invention provides a process for the preparation of tertiary amines of the general formula

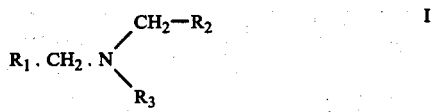
                                    I in which $R_1$ is an alkyl or alkenyl radical having from 7 to 23 carbon atoms, which may be straight-chain or branched, $R_2$ is identical with $R_1$ or is hydrogen, and $R_3$ represents $CH_3$, $C_2H_5$, $C_3H_7$ or $C_4H_9$, by reacting a liquid reactant, which is an aliphatic alcohol or an aldehyde of the general formula $$R_1 \cdot CH_2 \cdot OH \qquad\qquad II$$

                                   III or a mixture thereof,
in which $R_1$ is defined as in formula I above, with a circulating gaseous mixture containing hydrogen and a starting primary or secondary amine of the general formula

                                     IV in which $R_4$ is hydrogen or is identical with $R_3$ (defined in formula I), in the presence of hydrogenation-dehydrogenation catalysts, at a pressure of up to 5 atmospheres, preferably near atmospheric pressure, and at a temperature of from 160° to 230° C., then stripping off the water formed in the reaction by said circulating gaseous mixture and removing the water from said gaseous mixture, finally recirculating said gaseous mixture into said liquid reactant, with the improvement that combines the presence of a copper-chromium oxide catalyst with a proportion of the starting amine of formula IV which is kept in the range of from 1 to 20, preferably from 3 to 10% by volume, calculated on the total amount of said circulating gaseous mixture.

The reaction of alcohols with ammonia, primary and secondary amines to yield the corresponding substituted primary, secondary and tertiary amines, in the presence of hydrogenation-dehydrogenation catalysts and optionally hydrogen, has already been known in the art (cf. Houben-Weyl, Vol. 11/1, pp. 126 et seq.). Depending on the state of aggregation of the alcohol or the amine, the reaction may be carried out without pressure or under pressure in the gaseous or the liquid phase.

In U.S. Pat. No. 2,953,601 the pressureless reaction of alcohols (for example, isooctanol) with ammonia has been described. However, the aminolysis does not follow a regular pattern, i.e. it leads to a mixture of primary, secondary and tertiary amines with a high proportion of additional unwanted by-products at the same time.

Preferably tertiary amines of the nature claimed are obtained according to U.S. Pat. No. 3,223,734 by the reaction of primary and secondary amines with alcohols in the presence of hydrogenation-dehydrogenation catalysts at a temperature in the range of from 150° to 230° C. The water being formed in the course of the reaction is eliminated from the process. Hydrogen can be used as sparging gas but is not necessary for the reaction (column 4, line 49). Primary and secondary amines containing at least one methyl group attached to the N atom are only reacted with Raney-Nickel as catalyst and without addition of hydrogen. Due to this fact, considerable amounts of undesired condensation and by-products are obtained, which causes the yield to decline. In Examples 17 and 18, dodecanol and hydrogenated tallow alcohol are reacted, in the presence of Raney-Nickel, with large excess amounts of dimethylamine or methylamine, to give tertiary dimethyldodecylamine (69.5%) or tertiary di-(tallow alkyl)-methylamine (79.1%), respectively.

The re-working of the Examples showed, however, that the two tertiary amines mentioned still contain considerable amounts of other tertiary amines. The reason for this fact is that dimethyl- and monomethylamine used disproportionate, in the presence of Raney-Nickel, among others into monomethyl- or dimethylamine, respectively. By this reason other tertiary amines than those expected are obtained, which, however, makes the yield of the tertiary amines obtained appear too high.

The residual proportion of the reaction products of Examples 17 and 18 has not been further described. It became evident from the re-working of the Examples mentioned above that the products obtained include - besides the undesired tertiary amines mentioned before - also primary and secondary amines, as well as highly-condensed by-products.

The process of U.S. Patent Specification No. 3,223,734 is not appropriate for a large-scale preparation of, for example, long-chain tertiary dimethylalkylamines or tertiary methyldialkylamines due to the small yields, and also due to the fact that these tertiary amines produced do not show the required degree of purity.

According to the present invention it has been possible to eliminate the above-mentioned drawbacks of U.S. Patent No. 3,223,734 by using copper chromite catalysts, as well as by using large amounts of hydrogen. In contradistinction to nickel catalysts, the copper chromium oxide catalysts do not cause an unfavorable disproportioning and decomposition of the primary and secondary amines used, nor of the tertiary amines produced.

Finally, U.S. Patent No. 3,366,687 shows that primary alcohols having a longer chain react also with dimethylamine in a largely regular manner, to give dimethylalkylamines (cf. Test 4 pertaining to Table III). However, the conversion rates obtained in this way are absolutely unsatisfactory with regard to an industrial process for reasons stated below.

It has also been attempted, therefore, to react the corresponding alkylhalides, instead of the alcohols, with dimethylamine. However, these starting compounds are generally not as easily accessible as the corresponding alcohols, for which reason they are also more expensive. It is also possible that undesired quaternary ammonium compounds are found as by-products in the aminolysis. The acids formed in the course of the reaction (for example, HCl) need to be recovered or neutralized which causes additional expenses, in particular with regard to waste water problems.

The task of the present invention is to develop a process for the economical preparation of tertiary amines, by means of the aminolysis known in the art, with high yields and with practically complete conversion rates.

The above-mentioned task has been solved by reacting the alcohol or the aldehyde or mixtures thereof by means of a copper-chromium oxide catalyst, at normal pressure or a slight excess pressure of up to 5 atmospheres gage and at a temperature in the range of from 160 to 230° C., with short-chain primary and secondary amines containing at least one methyl group, in admixture with large amounts of hydrogen in the liquid phase, in which process the amine proportion of the gas mixture is in the range of from 1 to 20% by volume, by discharging the water formed in the reaction rapidly with the gas current and eliminating it from the same, and by recirculating subsequently the gas mixture consisting of amine and hydrogen continuously into the process. Starting amine and hydrogen have to be supplemented to the circulating gaseous mixture in an amount to keep the proportions of said amine and hydrogen in the range defined above.

In this way it is possible to obtain tertiary amines, with a conversion rate of more than 99% of the alcohols used, in a yield of up to 95% and a degree of purity of from 98 to 100%. The undesired by-products which are formed by a self-condensation of aldehydes present as intermediate products (or starting products) are at the same time obtained only in a minor amount which can be kept below 5% under optimum reaction conditions. The said by-products are left as a residue in the distillation of the amines and can thus be easily eliminated.

In order to carry out the process according to the invention, the respective alcohol to be reacted is placed into a stirring vessel which can be heated and which is provided with a device for the circulation of the amine-hydrogen mixture and for the elimination of the reaction water from the cycle, in admixture with from 1 to 10% by weight, preferably from 3 to 5% by weight, of catalyst. The contents of the vessel is then heated as rapidly as possible to a temperature in the range of from 160° to 230° C., preferably from 190° to 210° C., while stirring thoroughly and passing an amine-hydrogen mixture in which the amine proportion is from 1 to 20% by volume, preferably from 3 to 10% by volume through the liquid reactant; by means of this process the formation of by-products which takes place particularly at lower temperatures is suppressed, and any water formed can be expelled from the beginning in a largely quantitative manner. Water is stripped off in known manner in a temperature-controlled packed column; any entrained product, such as alcohol or tertiary amine already formed, is recycled via a separator into the reaction vessel. In order to ensure a good mixing of the reaction components, which is essential for a successful reaction, the throughput of the reaction product by means of a rotary pump installed outside the vessel is advantageous besides thorough stirring. The amount of gas required is in the range of from 50 to 150 l/h per mole of the respective alcohol or 150 to 600 l/h per kg of alcohol. Larger amounts of gas are in fact advantageous in order to reduce the reaction time and also the formation of by-products, however, they are less economical. Such large amounts of gas, as they are required for the process of the invention, are advantageously circulated continuously by the installation of a ventilator. As in the course of the process small amounts of gaseous by-products are formed (hydrocarbons, carbon monoxide) and up to 1% of the amine used is decomposed, it is advantageous — with the continuous use of the circulating gas — to replace part of the same by fresh gas. The amine (and hydrogen) content of said fresh gas must be in a proportion to keep the amine proportion in the circulating gaseous mixture within the range set out above. Preferably the amine proportion in the circulating gaseous mixture should be constant or nearly constant over the whole reaction time. The progress of the reaction may be followed easily by controlling the amount of water formed. If no water is separated any more, the reaction is completed. Whereas on the basis of the reaction equation

or

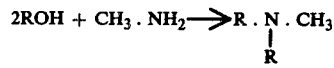

it was to be expected that the reaction would develop in the desired way more rapidly with a higher concentration of amine in the circulating gas mixture, it was a surprising fact which could not have been foreseen that the best results are obtained with a very low amine concentration in the gas mixture. In this respect, the lower limit of the amine concentration is given in that the amount of amine in the circulating gas for the reaction according to the present invention is at least of such a level that there is no amine deficit, for such a deficit would encourage the formation of undesired by-products and increase the time of reaction. The risk of an amine deficit may be balanced by increasing amounts of circulating gas, since by this measure more amine is offered in the time unit. With a strongly increasing amine concentration in the circulating gas, the formation of by-products is also increased. The hydrogen proportion in the circulating gas is 80 to 99%, preferably 90 to 97% by volume. The hydrogen proportion in the circulating gas may be replaced only by from 0 to 40%, preferably from 0 to 30% by volume, calculated on the total amount of hydrogen, of inert gases, for example nitrogen or methane. Thus it becomes evident that hydrogen is of great importance for the reaction mechanism of the process of the invention, although it is not indicated in the gross equation cited above. These findings are in direct contrast to the information given in U.S. Patent No. 3,223,734, column 4, lines 4 to 68, where it has been expressly stated that hydrogen serves to expel the reaction water and may be completely replaced by inert gases (such as nitrogen) or by other techniques, for example, azeotropic distillation or the application of a vacuum.

Also, these findings are in contrast to the description given in U.S. Patent No. 3,366,687, column 4, lines 4 to 22, where it has been indicated that in the reaction of alcohols the yield of tertiary amine can be increased in the presence of small amounts of hydrogen; however, it is stated expressly that one-third mole of hydrogen is completely sufficient for 1 mole of the alcohol, whereas in the process of the invention at least 20 times the amount of hydrogen over the total reaction time is required. The high hydrogen demand is decisive for the process claimed and this is contrary to the disclosure in U.S. Patent Nos. 3,223,734 and 3,366,687.

After the reaction has been completed, the catalyst is separated from the product via an appropriate filtering device (rotary filter, decanter), and the tertiary amines formed are distilled off for eliminating the by-products and are then obtained in a very pure form. The catalyst may be used repeatedly interim losses - about 0.2% per batch - are replaced. Thus, the catalyst consumption is less than 0.3%. An essential advantage with respect to the economy of the process is to be seen in the fact that the amount of amine used largely corresponds to the theory; amine losses in the waste gas or by solution in the separated reaction water, which may occur, are insignificant due to the low amine concentration in the circulating gas. Thus, there are practically no waste gas or waste water problems in this process.

The corresponding aldehydes show a reaction according to the process of the invention (requiring an equimolecular amount of hydrogen) which is similar to that of the long-chain alcohols and give yields of the same quality. If the aldehydes are used, the process is to be modified inasfar as the respective aldehyde is not to be introduced in its full amount at the beginning of the reaction, but is to be introduced into the reaction vessel only continuously or in batches over the reaction time, the dosing rate corresponding approximately to the reaction rate in the aminolysis of the alcohols. In this process it is required to introduce an amount of final product at the beginning of the reaction. If the total amount of aldehyde is used at once, up to 60% of by-products are formed. This variant of the process according to the invention may be technically important, if use is made of easily accessible aldehydes (for example those obtained in the oxosynthesis). Thus, the assumption hitherto existing, that the aminolysis proceeds in an intermediate phase via the corresponding aldehydes within a primary dehydrogenation, has been supported by practice.

As has been shown in the aminolysis of the aldehydes, the aminolysis of the alcohols to give tertiary amines may also be carried out in entirely continuous manner. As the amount of circulating gas and the gas composition are kept constant or nearly constant from the beginning to the end of the reaction, the above-described stirring vessel can be used in the most simple variant of the process, said vessel optionally being provided with the following additional devices: a dosing pump for introducing the alcohol as well as small amounts of catalyst, a unit for discharging the product from the stirring vessel via a filter or a decanter, in order to keep the reaction volume constant, as well as a device for eliminating small amounts of catalyst. Naturally, other variants of the continuous operation are also possible, for example a variant in which several reaction vessels are put in series (cascade).

Starting compounds in the sense of the present invention, which constitute the liquid reactant, are straight-chain and branched saturated and unsaturated aliphatic primary alcohols, for example, n-octyl alcohol, lauryl alcohol, myristyl alcohol as well as mixtures of those alcohols, moreover, the alcohols obtained according to the Ziegler process on the basis of ethylene and the mixtures thereof, furthermore, isooctyl alcohol, isotridecyl alcohol (obtained from the oxosynthesis by means of triisobutylene). Instead of using alcohols, use may also be made of the corresponding aldehydes, such as lauryl aldehyde, or aldehydes as those obtained according to the oxo process on the basis of olefins. In the same way, use may be made also of mixtures of alcohols and aldehydes.

As starting amines in the sense of the present invention there may be mentioned primary and secondary amines, such as methylamine, methylethylamine, methylbutylamine, preferably dimethylamine.

As catalysts there are used copper-chromium oxide catalysts. There are suitable in particular those catalysts which contain copper chromite and additionally copper oxide in an excess amount. By adding metal oxides of the first and second main groups of the periodic system such as potassium, magnesium or barium, the life of the catalysts is prolonged. A catalyst containing 41% by weight of copper, 31% by weight of chromium and 0.3% by weight of barium (corresponding to 69% by weight of copper chromite, 28% by weight of copper oxide and 0.5% by weight of barium oxide) is extremely suitable. Even though the metal oxides may be used in a concentrated form according to known methods, while being applied onto inert carriers, such as aluminum oxide or silica gel, carrier-free fully active catalysts are particularly suitable. The above-mentioned catalysts are at an elevated temperature (180° to 220° C.) excellent dehydrogenating catalysts having a reduced hydrogenating activity. The starting primary and secondary amines having at least one methyl group at the nitrogen atom are hardly attacked by these catalysts, even at higher temperatures, thus the reaction to yield tertiary amines proceeds without irregularities, with only a minor proportion of by-products. Nickel catalysts are not suitable for the process of the invention, as the amines disproportionate under the reaction conditions chosen and are decomposed.

The tertiary amines prepared according to the invention are used as intermediate products for various syntheses.

They are used particularly for the quaternization with methyl chloride and other alkylating agents, thus yielding quaternary ammonium salts. These compounds are applied in their turn as disinfectants and algicidal agents, and also as retarders in the textile dyeing. A wide field of application of the quaternary ammonium salts produced from the tertiary amines is their use as laundry softeners.

Reference is also to be made to the conversion of the tertiary amines with hydrogen peroxide into aminoxides which have found a wide field of application — particularly in combination with anionic components — in household detergents. Furthermore, the tertiary amines may also be used directly for the so-called liquid extraction of certain metal ions from aqueous solutions.

The following Examples serve to illustrate the present invention.

EXAMPLE 1

The reaction was carried out in the apparatus illustrated in the attached FIGURE. The apparatus consisted of a 1000 l stirring vessel (1) comprising a superimposed packed column (2), a circulating gas ventilator (3) and a circulating gas pipe (4) for the gaseous amines, hydrogen and optionally inert gases, a cooler (5), a separator (6) for water and highly volatile organic constituents, as well as feed pipes for the amine (7), H$_2$ (8) and optionally N$_2$(9) (as rinsing agent or optionally inert gas), and an exhaust gas pipe (10). The heating and cooling of the vessel was effected by means of the jacket (11). A pipe (12) leads from the separator (6) back to the vessel (1), through which the organic phase (14) separated from the aqueous phase (13) can be led back.

500 kilograms (2.68 kilomoles) of dodecanol-1 and 20 kg of copper chromite full catalyst (41% of Cu, 31% of Cr, 0.3% of Ba) were introduced into the heated stirring vessel (1) having a capacity of 1 m$^3$. The apparatus was rinsed with nitrogen fed in at (9), was heated, while stirring, the nitrogen was displaced by hydrogen fed in via (8), 200 Nm$^3$/h of hydrogen were circulated by operating the circulating gas ventilator, and at 150° C. the dosing of dimethylamine was started via (7). The reaction started at 150° C. and proceeded at its optimum at a temperature in the range of from 200° to 210° C., which could be seen from the separation of water. The dimethyl concentration in the circulating gas was adjusted to 5–7% by volume by means of dosing and measuring devices. As in the reaction small amounts of gaseous by-products are formed, 10% of the free circulating gas volume (1 m$^3$) were let off continuously every hour via (10) and were replaced by fresh gas. The overpressure in the apparatus was in the range of from 0.2 to 0.4 bar. In the column (2) provided with the cooler (5) mounted on top of the reaction vessel, a first separation took place between the amine-alcohol mixture on one hand and the reaction water on the other hand. In the separator (6) the organic phase was separated from the aqueous phase, and the (upper) organic phase was recirculated into the column.

After 6 hours the reaction was completed, and 53 liters of aqueous phase had separated. After cooling to 100° C. and rinsing with nitrogen, the product was filtered off from the catalyst by means of a rotary filter. In the course of this process 553 kg of crude amine were obtained, which had an amine number of 44.7 (theory: 46.8). The alcohol had reacted by 99.7%, and primary and secondary amines were contained in the crude product at a level of less than 1.5%. In order to carry out the reaction an amount of dimethylamine was used which exceeded the theoretical amount only by 2.4%. To separate the dimethyldodecylamine produced from high-boiling by-products, it was distilled off in vacuo without fractionating. The yield of pure product was 92.5%, calculated on the alcohol used, with a degree of purity of 98%.

EXAMPLE 2

500 kilograms of dodecanol-1 were reacted in the same apparatus as the one described in Example 1, under the same conditions as those mentioned before. In addition, however the reaction product was recirculated by means of a circulating pump, by being discharged at the bottom of the reaction vessel and being again introduced into the gaseous phase of the vessel. The capacity of the circulating pump was laid out in a way that the entire contents of the vessel were recirculated 6 times per hour. Owing to an improved mixing, the reaction time could be reduced to 5.2 hours. The alcohol had been reacted by 99.8%. After distilling-off, dimethyldodecylamine (purity 98.5%) was obtained with a total yield of 93.5%, calculated on the alcohol used, and of 94.6%, calculated on the dimethylamine used.

EXAMPLE 3 (a–c)

In order to demonstrate the influence of the dimethylamine concentration in the circulating gas on the yield of the product desired, and thus the economy of the process, the following tests were carried out:

a. 50 kilograms (240 moles) of synthetic alcohol with a chain distribution of 33% of $C_{12}$, 64% of $C_{14}$ and 3% of $C_{10}$ and $C_{16}$ and 2 kg of copper chromite catalyst (as mentioned in Example 1) were placed into a 100 l vanadium stirring vessel provided with the same additional devices as mentioned for the apparatus of Example 1. After rinsing with nitrogen, the vessel was heated within 30 minutes to 160° C., while stirring and circulating hydrogen, and subsequently the addition of dimethylamine was started. The amount of circulating gas was 12 m$^3$/h, and the concentration of dimethylamine in the circulating gas was in the range of from 5 to 10% by volume. 10 Liters of the circulating gas were replaced every hour by fresh gas. After 7 hours, at a reaction temperature of from 205° to 210° C., and after 4.7 l of water had been separated, the reaction was completed. In the following vacuum distillation of the crude amine, 5.2% of residue were left. The distilled dimethyl-$C_{10-16}$-alkylamine still contained 0.4% of alcohol, 0.6% of primary and secondary amine and 1.1% of non-amine proportions. The total yield was 91.3%, calculated on the alcohol, and 93.4%, calculated on the dimethylamine used.

(b) The amounts as well as the operating methods corresponded to those given under a) above, with the difference that the concentration of dimethylamine in the circulation was in the range of from 15 to 20% by volume. After about 8 hours and after 5.4 l of water had been formed, the reaction was completed. Following the working-up, 12.4% of residue remained in the vessel. The yield of dimethyl-$C_{10-16}$-alkylamine (purity 97.5%) was 83.5%, calculated on alcohol, and 80.7%, calculated on the dimethylamine used.

(c) The amounts as well as the operating methods corresponded to those given under b) above, with the difference that the dimethylamine concentration in the circulating gas was in the range of from 35 to 40% by volume. After 7.5 hours, the reaction was completed, and 6.4 l of water had been separated. The total yield of dimethyl-$C_{10-16}$-alkylamine (purity 98%) was only 73.8%, calculated on alcohol, and only 68.5%, calculated on the dimethylamine used.

The decreasing yields in the Examples 3 (a) to (c) are to be ascribed to the self-condensation of the aldehyde formed intermediately. The losses of dimethylamine in the reaction water are increased with an increase of the dimethylamine concentration in the circulating gas.

EXAMPLE 4 (a–e)

In order to test the influence of hydrogen on the mechanism of the process, the following test series was carried out:

1 mole of dodecanol-1 and 4% by weight of copper chromite catalyst, calculated on amount of alcohol (as mentioned in Example 1 above) were introduced int a laboratory apparatus consisting of a 1 l stirring apparatus provided with a thermostatic cooler, a connected condenser and separator for the separating of the reaction water. The agitator was turned on, and the mixture present in the recipient was heated at 100° C., while passing nitrogen through the same. Several mixtures of hydrogen, dimethylamine and nitrogen were passed from steel cylinders via capillaries and a dry gas meter through the reaction product and via coolers into the outlet pipe. The amount of gas mixture was kept constant at 100 l, and a reaction temperature of 210° C. was established within the apparatus. The results obtained with various gas compositions may be seen from the following Table:

| Test | Gas composition | | | Reaction time hours | Amine number | Prim. + sec. amine (% by weight) | Distillation residue (%) |
|---|---|---|---|---|---|---|---|
| | $H_2$ (l) | DMA* (l) | $N_2$ (l) | | | | |
| 4a | 105 | 5 | — | 6.5 | 44.1 | 1.5 | 5.1 |
| 4b | 95 | 5 | 10 | 7.5 | 43.8 | 1.5 | 6.2 |
| 4c | 75 | 5 | 30 | 7.7 | 43.4 | 1.5 | 7.3 |
| 4d | 55 | 5 | 50 | 8.0 | 39.5 | 1.5 | 17.8 |
| 4e | 85 | 5 | 50 | 7.5 | 43.1 | 1.5 | 7.6 |

*DMA = dimethylamine

From this Table it becomes evident that only up to 30 or 40% of hydrogen may be replaced by inert gases (for example, nitrogen).

EXAMPLE 5

In order to test the influence of various copper chromite catalysts on the process, the following test series were performed:

300 grams (1.43 moles) of synthetic alcohol having a chain distribution of 33% of $C_{12}$, 64% of $C_{14}$ and 3% of $C_{10}$ and $C_{16}$, as well as 15 g of the respective catalyst were introduced into the laboratory apparatus described in Example 4 above. At a temperature in the range of from 208° to 210° C., 110 l of a gas mixture consisting of from 90 to 95% by volume of hydrogen and from 5 to 10% by volume of dimethylamine was passed every hour through the mixture, while stirring, and the reaction water formed was removed by condensation. The results obtained with different catalysts at otherwise equal reaction conditions have been summarized in the following Table.

| Type of catalyst | Reaction time (hours) | Tert. amine equiv. % | Alcohol % by wt. | Distillation residue (% by wt.) | Amine number |
|---|---|---|---|---|---|
| Copper chromite No. 1 | 6 | 99.8 | 0.5 | 4.8 | 41.0 |
| copper chromite No. 2 | 6.5 | 99.7 | 0.5 | 5.6 | 40.4 |
| copper chromite No. 3 | 8 — | 98.6 | 0.9 | 11.5 | 39.0 |
| copper chromite No. 4 | 7 — | 99.3 | 0.5 | 5.3 | 40.8 |
| copper chromite No. 5 | 7 — | 99.9 | 0.5 | 8.3 | 39.3 |
| Raney-Nickel | 5.5 | 76.6 | 0.5 | 41.7 | 28.5 |

| Specification of the copper chromite catalysts: | | | |
|---|---|---|---|
| Catalyst | Copper (%) | Chromium (%) | Barium (%) |
| No. 1 | 40.5 | 31 — | 0.3 |
| No. 2 | 31.6 | 33.4 | 9.4 |
| No. 3 | 30.3 | 30.5 | 9.1 |
| No. 4 | 35.2 | 30.0 | 8.2 |
| No. 5 | 41 — | 30 — | — |

This Table shows that whereas very similar results are obtained with different copper chromite catalysts, Raney-Nickel shows a completely different behavior - from 40 to 50% of byproducts as well as larger amounts of primary and secondary amines are formed.

EXAMPLE 6

50 kilograms of isotridecylalcohol (a mixture of branched $C_{13}$-alcohols from the oxosynthesis of $C_{12}$-olefins) having an OH number of 281 and 1.5 kg of copper chromite catalyst as mentioned in Example 1 above were introduced into a 100 l reaction vessel as the one mentioned in Example 3 above, and the mixture was heated rapidly, while stirring and passing hydrogen circulating gas through the same. The amount of circulating gas was 18 $Nm^3/h$, and the dimethyl amine concentration in the circulating gas was from 5 to 6% by volume; 10% of the volume of the circulating gas were replaced every hour by fresh gas. One hour after the heating started, a reaction temperature of 210° C. was reached, and 6 hours later the reaction was completed. 4.7 liters of amine-containing water had been separated. At a reaction rate of 99.5%, the yield of dimethylisotridecylamine was 92.5%, calculated on alcohol, at a degree of purity of 98.5%.

EXAMPLE 7

In a manner analogous to that of Example 5, 50 kg of isooctylalcohol (a mixture of branched $C_8$-alcohols from the oxosynthesis of pure heptenes obtained via a co-dimerisation of butene and propylene) was reacted with dimethylamine, in the presence of copper chromite catalyst and in the amount as mentioned in Example 1. Due to the low boiling point of isooctanol (180° – 185° C.), the reaction was carried out under a slightly increased pressure (3 to 4 bars). The reaction temperature was in the range of from 195° to 200° C., the amount of circulating gas was 20 N $m^3/h$, and the dimethylamine concentration in the circulating gas was from 6 to 8% by volume. The product and the water were discharged via a lateral pipe of the column, were then separated in a separator, and the organic phase was again introduced into the reaction vessel. After 8 hours the reaction in which 7.8 l of amine-containing water had separated, was completed.

The dimethyl-isooctylamine was obtained in total yield of 91.8%, calculated on the alcohol (purity 98.8%).

EXAMPLE 8

In a manner analogous to that of Example 5, 50 kg of ocenol (oleyl alcohol having a iodine number of 92) together with 2 kg of the catalyst of Example 1 were reacted with dimethylamine. The reaction temperature was 210° C., the amount of circulating gas was 14 $Nm^3/h$ and the amine concentration in the circulating gas was from 4 to 6% by volume; 10% of the circulating gas volume were replaced every hour by fresh gas. After 5.5 hours the reaction was completed; 3 l of water had separated. By way of distillation, the pure dimethyloleylamine was obtained with a yield of 93.4%. The analysis showed the following values:

| | |
|---|---|
| Oleyl alcohol | 0.5% by weight |
| Tertiary amine | 99.3% by weight |
| Other non-amine proportions | 0.1% by weight |
| Iodine number | 83 |

EXAMPLE 9

According to the same method of operation as described in Example 8, dimethyl-$C_{18-24}$-alkylamine was obtained in a yield of 92.3% and with a degree of purity of 98%, from stenol ($C_{18}$ to $C_{24}$-alcohol having the composition of $C_{18}$ = 10%, $C_{20}$ = 55 to 60%, $C_{22}$ = 25 to 30%, $C_{24}$ = 0 to 5% with an OH number of 200) within 4.5 hours.

EXAMPLE 10

500 grams of methyldidecylamine and 15 g of catalyst as described in Example 1 above were introduced into a laboratory apparatus as the one mentioned in Example 4 above. As a supplement to the apparatus described in Example 4, the reaction recipient was connected via a product pipe with a dosing pump, so that it was possible to add a defined amount of product during the reaction in defined periods of time.

The recipient was rinsed with nitrogen, the contents were heated, while stirring, at 210° C. and a mixture of 100 l of hydrogen and 5 l of monomethylamine/h was passed through. 60 Grams of decanol-1 were continuously added every hour via the dosing pump. The analysis of samples drawn off every hour showed that the mixture remained unchanged as to its composition, in that it contained 85 equivalent % of methyldidecylamine and about 15 equivalent % of methyldecylamine, whereas the alcohol had been reacted practically completely. After 5 hours and following another addition of 2 moles of decanol-1,32.8 ml of water had been separated. In order to completely react the secondary methyldecylamine formed intermediately, the addition of methylamine was stopped, and the amount of decanol-1 calculated beforehand was added in doses under pure hydrogen. After a total of 7 hours the reaction was completed; 35.5 ml of water had been separated altogether. The crude amine was distilled, while 6.1% of residue were left. The entire yield of methyldidecylamine, calculated on the alcohol used, was 92.4% with a purity of the product of 98%.

EXAMPLE 11

In a manner analogous to that of Example 10 stearyl alcohol was reacted with monomethylamine to yield methyl-distearylamine. In addition the reaction gas consisting of 100 l of hydrogen and 5 l of monomethylamine was circulated via a gas pump, and the amine while had been used up in the reaction was continuously added in doses via a mercury dipping pipe. The pressure in the apparatus was kept constant. After a continuous addition of 2 moles of stearyl alcohol (90 g/h) within 6 hours, the amine addition was stopped. 33.8 milliliters of water had separated. The reaction was completed by adding the calculated amount of stearyl alcohol. After distillation of the crude product, 4.1% of higher condensed by-products were left. The yield of methyldistearylamine was 92.4% with a degree of purity of the product of 98.5%. cl EXAMPLE 12

400 grams of dimethyldodecylamine and 15 g of the catalyst of Example 1 were introduced into a laboratory apparatus as has been described in Example 10. The apparatus was rinsed with nitrogen, the contents were heated, while stirring, then a mixture of 10 l of dimethylamine and 180 l of hydrogen per hour was passed through, and at 210° C. the addition in doses of 50 g/h of laurylaldehyde (of 96% strength) via a micro-dosing pump was started. A steady water separation of 4.7 ml/h corresponded to the continuous aldehyde addition. The analysis of samples taken every hour showed that the amine number remained also unchanged at 44 to 44.5. After 369 g (2 moles) of lauryl aldehyde had been added in doses within about 7 hours, the reaction was stopped. According to the analysis, the yellow-colored reaction product with an amine number of 44.4 had the following composition:

| | |
|---|---|
| Tertiary amine | >99% by weight |
| Lauryl aldehyde | 0.1% by weight |
| Dodecanol-1 | <0.5% by weight. |

In addition, 8.3% by weight of higher condensed by-products had been formed. Following the distillation, a dimethyldodecylamine (purity 99%) having an amine number of 46.1 (theory: 46.9) was obtained in a yield of 88.5%.

A parallel reaction using dodecanol-1 instead of the aldehyde proceeded in an analogous manner. In this case the yield of dimethyl-dodecylamine was 92%.

EXAMPLE 13 (Comparison with Example 12)

The reaction of lauryl aldehyde with dimethylamine was carried out in the same apparatus as that described in Example 10, with the difference that the aldehyde was not added in doses gradually, but was introduced at once. After rinsing the apparatus with nitrogen, the contents were heated to 210° C., while stirring and introducing 180 l/h of hydrogen, and at this temperature the addition in doses of 10 l/h of dimethylamine was started. After an operation of 6 hours with the simultaneous separation of 35 ml of water, the reaction was completed. The dark brown reaction product with an amine number of 33.2 showed in the distillation a residue of 59%. The yield of dimethyldodecylamine was only 37%.

EXAMPLE 14

400 grams of methyl-n-butyl-n-decylamine with the amine number of 44.8 and 15 g of catalyst of the kind described in Example 1 above were introduced in a 2 l glass recipient into the laboratory apparatus as has been described in Example 10. After rinsing the apparatus with nitrogen and heating at 210° C., while stirring, a gas mixture consisting of 100 l of hydrogen (from a pressure-tight container) and 10 l of methyl-n-butylamine (via an evaporator) was passed every hour through the outlet pipe; at the same time the continuous addition of 60 g/h of decanol via a dosing pump was started. A steady separation of water of 5.6 ml/h corresponded to the addition. The analysis of samples taken every hour showed that the amine number (42.6) remained almost unchanged. After about 6 hours the addition of alcohol was stopped, the gas mixture was replaced by nitrogen and was cooled to 100° C.; 34.5 ml of water had been separated altogether. The crude amine was filtered off from the catalyst and was distilled, in which process 5.2% by weight of residue were left. The total yield of methyl-n-butyl-n-decylamine was 93.1% with a degree of purity of 97.5%.

What is claimed is:

1. In a process for the preparation of tertiary amines of the formula

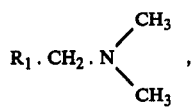

wherein
R$_1$ is an alkyl or alkenyl radical having from 7 to 23 carbon atoms, by reacting a liquid reactant selected from the group consisting of alcohols of the formula

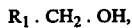

aldehydes the the formula

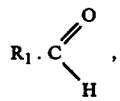

wherein R$_1$ is a defined above, and mixtures thereof, with a circulating gaseous mixture containing hydrogen and dimethylamine as starting amine at pressure of up to 5 atmospheres and at temperatures of 160° to 230° C., stripping off the water formed in the reaction by means of said circulating gaseous mixture and removing said water from said gaseous mixture, and recirculating said gaseous mixture into said liquid reactant, wherein the improvement comprises carrying out the reaction with a proportion of the starting amine in said circulating gaseous mixture being in the range from 1 to 20 percent by volume and in the presence of a copper-chromium oxide catalyst.

2. The process as claimed in claim 1, wherein the proportion of the starting amine in said gaseous mixture is from 3 to 10 percent by volume.

3. The process as claimed in claim 1, which comprises replacing part of said gaseous mixture before being recirculated into said liquid reactant by a mixture containing hydrogen and the starting amine with an amine content to maintain the amine proportion of said circulating gaseous mixture on a constant level.

4. The process as claimed in claim 1, wherein an amount of final product effective as reaction medium is introduced before starting the reaction and said liquid reactant is added continuously during the reaction period.

5. The process as claimed in claim 4, wherein the final product is discharged continuously.